United States Patent Office 2,807,638
Patented Sept. 24, 1957

2,807,638

POLYHYDRIC ALCOHOL ESTER OF A TERTIARY ALKYL - SUBSTITUTED CYCLOHEXANECARBOXYLIC ACID

Rupert C. Morris, Berkeley, and Vernon W. Buls, Walnut Creek, Calif., assignors to Shell Development Company, Emeryville, Calif., a corporation of Delaware No Drawing. Application May 1, 1953,
Serial No. 352,588

9 Claims. (Cl. 260—468)

This invention relates to a new class of organic compounds. More particularly, the invention relates to esters of substituted cyclohexanecarboxylic acids, and to their utilization, particularly as plasticizers for vinyl-type polymers.

Specifically, the invention provides useful and valuable esters of cyclohexanecarboxylic acids having one of their ring carbon atoms joined to at least one tertiary alkyl radical, and polyhydric alcohols. The invention further provides vinyl-type polymers particularly the vinyl halide polymers, plasticized with the above-described esters.

This application is a continuation-in-part of our parent application Serial No. 160,818, filed May 8, 1950, now abandoned.

Vinyl-type polymers, particularly the vinyl halide polymers, may be utilized for many applications in industry due to their wide range of properties. The polymers find application in the production of coating compositions, fibers, films, shaped articles, and the like. These polymers are usually difficult to process and are quite brittle, and before they can be utilized in many of their applications it is necessary to add thereto some type of plasticizing agent. The inherent insolubility of many of these polymers makes it difficult to find satisfactory plasticizers. Substances which act as plasticizers for other resinous material, such as the cellulose derivatives, are in many cases incompatible with this type of polymer. In addition, many of the compounds which are compatible are required in such large amounts as to impair the desired physical properties of the said polymer. Other compounds which are otherwise satisfactory as plasticizers have a tendency to evaporate from the plasticized composition after short periods of exposure to heat and the composition then becomes brittle and disintegrates. Still other compounds act as satisfactory plasticizers at or above room temperature but when the temperature is lowered to 0° C. and below, the plasticized composition loses its flexibility and is easily cracked.

It is an object of the invention therefore to provide a new class of plasticizer for the vinyl-type polymers. It is a further object to provide plasticizers for the vinyl-type polymers which are relatively non-volatile and are not readily lost from the compounded resin when it is exposed to high temperatures. It is a further object to provide plasticizers for the vinyl-type polymers which impart good low temperature flexibility to the resulting resin. It is a further object to provide plasticized vinyl-type polymers which possess many improved physical properties. It is a further object to provide plasticized vinyl-type polymers having excellent resistance to shrinkage and loss of weight when exposed to high temperatures. It is a further object to provide plasticized vinyl-type polymers having improved low temperature flexibility. It is still a further object to provide plasticized vinyl-type polymers having good strength and improved resistance to water. It is a further object to provide a new class of organic compounds having many unexpected and beneficial properties. Other objects and advantages of the invention will be apparent from the following detailed description thereof.

It has now been discovered that these and other objects of the invention may be accomplished by the esters of cyclohexanecarboxylic acids having one of their ring carbon atoms joined to at least one tertiary alkyl radical, and polyhydric alcohols. These esters have proved to be superior plasticizers for the vinyl-type polymers, as they are highly compatible therewith and yield plasticized compositions having excellent tensile strength and flexibility over a wide range of temperatures. In addition, they have been found to have a very low rate of volatilization from the vinyl-type polymers and compositions containing these esters are able to withstand long periods of exposure to air and relatively high temperatures without shrinking or undergoing substantial deterioration.

The acids used in producing the novel esters of the invention comprise the monocarboxylic acids containing a ring of six carbon atoms and having one carbon atom of the said ring joined to a carboxyl group and another ring carbon atom joined to at least one tertiary alkyl radical. The expression "tertiary alkyl" as used throughout the specification and claims in relation to the side chain refers to alkyl radicals wherein the alpha carbon atom, i. e., the carbon atom joined to the free bond of the radical, is a tertiary carbon atom. The other portion of the alkyl side chain may, and preferably is in some cases as indicated below, highly branched, i. e., the remaining carbon atoms may be tertiary or quaternary carbon atoms. Examples of the tertiary alkyl radicals are tert-butyl, tert-octyl, tert-amyl, 1,1-diethylbutyl, 1-methyl-1-ethylhexyl, 1,1-dimethylhexyl, 1,1-ditert-butylamyl, 1,1-diethylhexyl, 1,1-diisopropylbutyl, and the like.

As the tertiary alkyl-substituted cyclohexanecarboxylic acids contain at least two substituents on the cyclohexane ring they may exist in the form of stereoisomers, i. e., as a "cis" or "trans" isomer depending on the position of the substituents in relation to the plane of the cyclohexane ring. These isomers may generally be distinguished by their melting points and/or solubility characteristics. Unless otherwise specified, the names of acids and esters cited in the specification and claims refer in a generic sense to both isomers and mixtures thereof.

Illustrative examples of the above-described tertiary alkyl-substituted cyclohexanecarboxylic acids include, among others, 4-tert-hexylcyclohexanecarboxylic acids, 2-chloro-3-tert-butylcyclohexanecarboxylic acid, 2-chloro-4-tert-hexylcyclohexanecarboxylic acid, 2-methyl-5-tert-butylcyclohexanecarboxylic acid, 3,5-di(tert-octyl)cyclohexanecarboxylic acid, 4-tert-decylcyclohexanecarboxylic acid, 2-hydroxy-3-tert-pentadecylcyclohexanecarboxylic acid, 2-amino-4-tert-octadecylcyclohexanecarboxylic acid, 2,4-di(tert-octyl) 1,5-cyclohexanedicarboxylic acid, 3,5-di(tert-decyl)cyclohexanecarboxylic acid, 2-nitro-4-tert-octylcyclohexanecarboxylic acid, and 2,5-dimethyl-4-tert-hexadecylcyclohexanecarboxylic acid.

Preferred acids to be used in producing the novel esters are the 4-tert-alkyl-substituted cyclohexanecarboxylic acids containing from 11 to 20 carbon atoms and preferably having from four to nine carbon atoms in the said tert-alkyl radical. Examples of these preferred acids are 2-methyl-4-tert-butylcyclohexanecarboxylic acid, 2,3-dichloro-4-tert-hexylcyclohexanecarboxylic acid, 5-cyano-4 - tert - butylcyclohexanecarboxylic acid, 3-butyl-4-tert-butylcyclohexanecarboxylic acid, 2,5-diethyl-4-tert-butyl-cyclohexanecarboxylic acid.

Coming under special consideration are the saturated monocarboxylic acids containing a ring of six carbon atoms and having one carbon atom of the said ring joined to a hydrogen atom and a carboxyl group, another ring carbon atom, three carbon atoms removed therefrom, joined to a hydrogen atom and a tert-alkyl radical, and the remaining ring carbon atoms joined to members of the group consisting of hydrogen, halogen, and straight chain alkyl radicals, preferably containing from 1 to 4 carbon atoms.

The above-described tertiary alkyl-substituted cyclohexane-carboxylic acids may be prepared by contacting an alkaline aqueous solution of a relatively water soluble salt of the corresponding tertiary alkyl-substituted benzoic acid with hydrogen at an elevated pressure and temperature above 150° C. in the presence of a hydrogenation catalyst, such as Raney nickel, and subsequently converting the resulting salt to the acid form.

The tertiary alkyl-substituted benzoic acids, whose salts are employed in this process may be prepared by a method described and claimed in Hearne et al. U. S. 2,578,654.

The salts of the tertiary alkyl-substituted benzoic acids used in the preparation of the tertiary alkyl-substituted cyclohexane-carboxylic acids are those that are relatively water soluble, i. e., those that have a solubility of at least 0.5 part per 100 parts of water at 20° C. Preferred salts to be employed are the alkali and alkaline earth metal salts and ammonium salts of the aforedescribed acids, such as sodium tert-butylbenzoate, potassium tert-amylbenzoate, ammonium tert-butyl-benzoate, calcium tert-octylbenzoate, and the like.

The hydrogenation of the above-noted salts is accomplished in an alkaline medium, e. g., a reaction medium having a pH of at least 7.3. Occasional change to a neutral solution is not too detrimental but acid medium should be avoided in all cases.

The quantity of the aromatic acid salt employed in the reaction medium may vary over a considerable range depending chiefly on the solubility of the particular salt to be hydrogenated. Saturated solutions of the salts that have only limited solubility are generally preferred. In most cases, the quantity of the salt will vary from about 0.25 mol to 5 mols per 100 parts by weight of solution, and more preferably from 0.5 mol to 2 mols per 100 parts by weight of solution.

Suitable hydrogenation catalysts include the metals, such as copper, chromium, thallium, nickel, iron cobalt, tungsten, molybdenum, cerium, thorium, and the like. These are effective when employed in a finely divided state or deposited on an inert substance or carrier, such as pumice, silica gel, kieselguhr, charcoal, calcium carbonate, and the like. Other catalysts include the oxides or sulfides of the above-described metals, or mixtures comprising two or more metal oxides and/or sulfides, or one or more metal oxides or sulfides with one or more metals. Compound catalysts comprising two or more metals in admixture or alloyed as, for example, silver-copper, copper-chromium, copper-zinc, nickel-cobalt, and nickel-zinc, may also be used. Preferred catalysts are metals selected from the group consisting of nickel, iron, cobalt, copper, chromium, thallium, and their metal oxides and sulfides. Excellent results are generally obtained by employing a finely divided pyrophoric metal catalyst, such as Raney nickel, and such catalysts are usually the more preferred.

The amount of the catalyst employed may vary over a considerable range depending upon the type of catalyst employed, the substituted aromatic acid to be reduced, etc. In general, the amount of the catalyst will vary from 1% to 50% by weight of the organic reactants. Preferred amounts of catalyst range from 1% to 30% by weight. When Raney nickel is employed, it is generally employed in amounts varying from 1% to 20% by weight.

The catalyst is usually added directly to the aqueous solution of the salt and suspended therein by agitation. The usual procedure is to place the acid salt, water and catalyst in a suitable reaction vessel, to sweep out the atmospheric gases with hydrogen and subsequently force hydrogen from a continuous source into the vessel under pressure. Relatively low pressures, e. g., 500 to 1000 pounds per square inch are generally effective. Higher pressures, e. g., 1000 to 3000 pounds are correspondingly more effective and are generally the more preferred. Particularly preferred pressures range from 1000 to 2000 pounds per square inch. When the vessel is not continuously connected with a source of hydrogen under pressure, it may be desirable to make one or more additions of hydrogen during the reaction.

The temperature employed in the hydrogenation process should be 150° C. or above. The exact temperature range employed will depend chiefly upon the particular stereoisomer of the acid desired. It has been found that when the temperature is maintained within the lower range, i. e., from 150° C. to about 190° C. the low melting or cis form of the acid is obtained in predominate quantities. When the higher temperatures, e. g., from 190° C. to 300° C., are utilized the higher melting or trans form of the acid is obtained in predominate quantities.

Following hydrogenation, the catalyst and other solid material which may be present may be separated by filtering or centrifuging the reaction mixture. The acid salt formed in the hydrogenation process may be converted to the desired acid form while the salt is still in the reaction mixture or after it has been separated by any of the conventional means, such as by treating the salt with an acid as hydrochloric acid.

The apparatus employed in the hydrogenation process may be of any construction or design as long as it provides means for introducing and maintaining hydrogen at the desired pressure and means for maintaining the proper temperature. The conventional steel autoclave has proved very satisfactory for this process. The process may be conducted in a batchwise, semi-continuous or continuous manner.

A more detailed description of the tert-alkyl-substituted cyclohexanecarboxylic acids and their preparation may be found in our copending application Serial No. 202,814, filed December 26, 1950.

The polyhydric alcohols used in producing the novel esters of the invention are alcohols containing a plurality of esterifiable hydroxyl groups in their molecule. The alcohols may be aliphatic, alicyclic, or heterocyclic. They may also contain oxygen or sulfur ether linkages in open-chain portions of their molecule and may be further substituted with non-interfering substituents, such as halogen atoms, alkoxy radicals, and the like. Examples of the polyhydric alcohols are ethylene glycol, glycerol, polyglycerol, pentaerythritol, polypentaerythritol, mannitol, methyltrimethylolmethane, 1,4,6-octanetriol, butanediol, 1,3-pentanediol, 1,4-hexanediol, 2,8-dodecanediol, 1,8-octanediol, chloropentanediol-1,5, glycerol monoethyl ether, triethylene glycol, 2-ethylhexanediol-1,4, 3,3'-thiodipropanol, 4,4'-thiodibutanol, 4,4'-thiodihexanol, 3,5-dithiahexanediol-1,6, i. e.

3,6-dithiaoctanediol-1,8, and cyclohexanediol-1,4.

Preferred polyhydric alcohols to be used in producing the novel esters are the open-chain aliphatic alcohols possessing from 2 to 3 esterifiable hydroxyl groups and containing from 2 to 18 carbon atoms. Examples of these preferred polyhydric alcohols are diethylene glycol, glycerol, 1,4,6-heptanetriol, 2,5-pentanediol, 3-methyl-2,4-hexanediol, 2,4-butanediol, triethylene glycol, tetraethylene glycol, 2,7-octanediol, 2,8-dodecanediol, 3,7-tetradecanediol, 1,5,8-dodecanediol, and glycerol monomethyl ether.

Particularly preferred polyhydric alcohols are the open-chain dihydric alcohols containing from 2 to 12 carbon atoms, preferably having their hydroxyl groups attached to non-adjacent carbon atoms, such as diethylene glycol, 2,5-pentanediol, 3-methyl-2,4-hexanediol, 2,4-butanediol, trimethylene glycol, tetraethylene glycol, and 2,7-octanediol.

Coming under special consideration as particularly preferred alcohols, especially when the resulting esters are to be used as plasticizers for the vinyl halide polymers, are the open-chain aliphatic dihydric alcohols having at least one thio ether linkage, i. e., a —S— linkage, joined directly to carbon atoms, and preferably containing not more than 15 carbon atoms. Examples of these preferred alcohols are 3,3'-thiodipropanol, 4,4'-thiodibutanol, 3,5-dithiahexanediol-1,6, 4,4'-thiodihexanol, 2,5-dithiaoctanediol-1,8, 2,5,7-trithiadodecanediol-1,9, 4,7-dithiadodecanediol-1,10, 4,4'-thiodihexanol, and the like. Especially preferred are the open-chain aliphatic dihydric alcohols having one thio ether linkage joined to carbon atoms and containing from 4 to 15 carbons atoms.

The novel esters of the invention are theoretically obtained by esterifying one of the above-described alcohols with one or more of the above-described tert-alkyl substituted cyclohexanecarboxylic acids. Examples of the novel esters are 3,3'-thiodipropanol bis-3-tert-butylcyclohexanecarboxylate, 4,4'-thiodipropanol bis- 4 - tert-amylcyclohexanecarboxylate, diethylene glycol bis-4-(1',1'-dibutylhexyl)-cyclohexanecarboxylate, 1,3-hexanediol bis-5-tert-hexylcyclohexanecarboxylate, glycerol bis-4-tert-butylcyclohexanecarboxylate, tetraethylene glycol bis-3-tert-heptylcyclohexanecarboxylate, pentaerythritol tri-4-tert-butylcyclohexanecarboxylate, 1,4-hexanediol bis-3,5 - dichloro - 4 - tert-butylcyclohexanecarboxylate, 3,3'-thiodibutanol 4 - tert - decylcyclohexanecarboxylate, 1,6-hexanediol bis - 2 - cyano-4-tert-octylcyclohexanecarboxylate, glycerol tri - 3 - tert - butylcyclohexanecarboxylate, 1,3,5-hexanetriol tri-2-chloro-4-tert-hexylcyclohexanecarboxylate, glycerol monoethyl ether bis-5-tert-butylcyclohexanecarboxylate, 1,3,5-hexanetriol bis-2-bromo-4-tert-amylcyclohexanecarboxylate, and the like.

The preferred esters of the invention, i. e., those prepared from the preferred alcohols and acids described above may be illustrated by diethylene glycol bis-4-tert-butylcyclohexanecarboxylate, 3,3'-thio-dipropanol bis-4-tert-amlcyclohexanecarboxylate, 1,4-butanediol bis-4-tert-octylcyclohexanecarboxylate, 4,7-dithiadodecanediol-1,10 bis-4-tert-decylcyclohexanecarboxylate, 3,5-dithia-hexanediol-1,6 bis-4-tert-hexylcyclohexanecarboxylate, 1, 6-hexanediol bis-2-methyl-4-tert-octylcyclohexanecarboxylate, 1,5-heptanediol bis-3-chloro-4-tert-hexylcyclohexanecarboxylate, 3,3'-thiodibutanol bis-2-cyano-4-tert-decylcyclohexanecarboxylate.

The above-described esters may be prepared by any suitable method. They may be prepared by direct esterification of the above-described acids and polyhydric alcohols in the presence of an esterification catalyst, by reacting the polyhydric alcohols with an acid chloride in pyridine, or by an ester-exchange reaction.

It is usually preferred, however, to prepare the esters by direct esterification. According to this method, the acids and polyhydric alcohols are heated together and the water formed during the reaction is removed, preferably by distillation. Catalysts may be used in the direct esterification process if desired. Such catalyst may be exemplified by p-toluenesulfonic acid, ethanesulfonic acid, hydrobromic acid, chloroacetic acid, sulfuric acid, benzenesulfonic acid, formic acid, boron and silicon fluorides, acid salts, such as monosodium and monopotassium sulfates, and salts of strong acids and weak bases, such as aluminum sulfate, zinc chloride, zinc sulfate, and the like. The amount of the catalysts employed will vary over a wide range depending upon the particular type of reactants, catalysts, and reaction conditions employed. In most cases, the amount of catalyst will vary between 0.1% to 5% by weight of reactants. Preferred amounts of catalyst to be employed in the esterification process vary between 0.5% to 2% by weight of reactants.

The amount of acid and polyhydric alcohol to be added to the reaction mixture will vary over a considerable range depending upon the type of products desired. In general, at least one mole of acid should be utilized for every hydroxyl group to be esterified. Thus, if two of the hydroxyl groups of the polyhydric alcohol are to be esterified with the substituted carbocyclic acids the alcohol will preferably be reacted with a double molar quantity to slight excess, i. e., 10% to 20% excess of the desired acids. The exact proportions of acid and polyhydric alcohol to be utilized may easily be determined for each individual case.

The esterification may be accomplished in the presence or absence of solvents or diluents. In case the solvents or diluents are desired, inert organic compounds, such as benzene, toluene, cyclohexanone, and xylene, and mixtures thereof, which do not interfere with the reaction may be used.

The temperature employed during the esterification may vary over a considerable range depending upon the type of reactants and catalysts to be employed. In most cases the temperature will range between about 40° C. and 250° C. with a preferred range being between 60° C. and 100° C. Higher or lower temperatures may be employed if desired or necessary.

In some cases it may be desirable to conduct the reaction in an inert atmosphere, such as nitrogen and carbon dioxide. Atmospheric, superatmospheric, or subatmospheric pressures may be used.

The separation of the esters formed in the reaction may be accomplished by any suitable means, such as extraction, distillation, fractional precipitation, and the like.

As indicated, the novel esters of the invention are particularly valuable as plasticizers for vinyl-type polymers and when used in this capacity form compounded resins having many improved properties. The vinyl-type polymers that may be plasticized with the novel esters are the homopolymers, copolymers and interpolymers of vinyl-type monomers. The expression "vinyl-type monomers" includes all those organic compounds containing at least one $CH_2=C<$ group in their molecule. Examples of these monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride, the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate, the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether, and the vinyl ketones, such as vinyl butyl ketone, and vinyl ethyl ketone.

A preferred group of vinyl-type polymers to be plasticized with the novel esters of the invention are the polymers of the halogen-containing vinyl-type monomers. Examples of this preferred group of polymers are polyvinyl chloride, polyvinyl bromide, polyvinylidene chloride, polyvinylidene bromide, copolymers of vinyl chloride and vinyl acetate, copolymers of vinyl chloride and vinylidene chloride, copolymers of allyl chloride and vinyl chloride, copolymers of vinylidene chloride and vinyl acetate, copolymers of vinyl chloride and methyl methacrylate, and the like.

Particularly preferred polymers to be plasticized with the novel esters of the invention are the vinyl halide polymers. The expression "vinyl halide polymers" as used throughout the specification and claims refers generically to the homopolymers, copolymers and interpolymers containing a predominant quantity, i. e., at least 60% by weight of the vinyl halides, as vinyl chloride and vinyl bromide. Examples of these preferred polymers are polyvinyl chloride, polyvinyl bromide, copolymers of vinyl chloride and vinyl propionate, copolymers of vinyl bromide and methyl methacrylate, and the like.

A single ester may be used as the plasticizer or a mixture of two or more of the compounds may be utilized. In addition, the novel esters may be used as plasticizers in combination with known plasticizers, such as dioctyl phthalate, dibutyl phthalate, tricresyl phosphate, and the like.

The amount of the esters to be incorporated with the above-described vinyl-type polymers may vary over a considerable range depending upon the particular type of polymer to be utilized, the intended use of the compounded resins, etc. In most cases the amount of the plasticizer will vary from about 20 to 150 parts by weight for every 100 parts by weight of resin. A more preferred range of plasticizer to be utilized comprises 40 parts to 75 parts by weight of plasticizer for every 100 parts by weight of resin.

Fillers and pigments such as whiting, channel black, clay, gum rosin, silica and others, and stabilizers, such as litharge, other lead compounds, some oxides of the bismuth and barium types and some silicates may also be added to the polymers along with the novel esters of the invention.

The vinyl-type polymers and the ester plasticizer may be compounded together by means of conventional equipment such as mills of the heated roll type or internal mixers. The plasticizer and other compounding ingredients, such as fillers and stabilizers, are worked into the vinyl polymer so that they are thoroughly dispersed therein by means of such equipment, and the resultant composition then molded, calendered, extruded or otherwise formed into articles of the desired shape by conventional procedure.

The novel esters of the invention may also be utilized in other important capacities in industry. They are valuable, for example, as lubricating oils or additives therefor, asphalt adhesive agents, water-proofing agents for inorganic greases, thickening agents or viscosity index improvers, solvents, rubber preservatives, vulcanizing accelerators, additives for insecticidal and germicidal compositions, textile lubricants, additives for dye preparations, wetting agents, dispersing agents for oils, detergents, polishes, and the like.

To illustrate the manner in which the invention may be carried out the following examples are given. It is to be understood, however, that the examples are for the purpose of illustration and the invention is not to be regarded as limited to any of the specific conditions recited therein. Unless otherwise specified, parts described in the examples are parts by weight.

*Example I*

An aqueous solution of sodium p-tert-butylbenzoate was prepared by dissolving 36 parts of p-tert-butylbenzoic acid in water containing 9 parts of sodium hydroxide. This mixture was alkaline to litmus. About 10 parts of Raney nickel was then added to 200 parts of this solution and the resulting mixture exposed to 1000 pounds hydrogen pressure at a temperature of about 175° C. The aromatic derivative hydrogenated very satisfactorily and an absorption of about 93% of theory was obtained in a very short period. When no further reduction in pressure took place the product was recovered by filtration and subsequently acidified with hydrchloric acid. The solid that separated was filtered and dried. When recrystallized from dilute alcohol (20% water) it was found that approximately 20% of the solid was a high-melting solid (melting point of about 174.5° C. to 175.5° C.) while the remainder was somewhat more soluble in the solvent and melted at 89.5° C. to 90.5° C. Analysis of the recrystallized acid showed it to be 4-tert-butylcyclohexanecarboxylic acid: percent carbon, calcd. 71.6, found 72.6; percent hydrogen, calcd. 10.9, found 10.51; acid value, eq./100 g. calcd. 0.542, found 0.541.

About 100 parts of a mixture of isomers of 4-tert-butylcyclohexanecarboxlic acid, produced above, 34 parts of diethylene glycol and 105 parts of toluene were placed in a kettle attached to a separating still-head. The apparatus was swept out with carbon dioxide for one-half hour and 0.2 part of sulfuric acid added. The mixture was then heated to reflux with a slow stream of carbon dioxide being passed through the reaction mixture. When no further water separated the reaction mixture was diluted with 2,000 parts of benzene, treated with decolorizing charcoal and then washed with water and dilute sodium carbonate. After flashing off the benzene and stabilizing at 2–3 mm., a viscous oil was identified as diethylene glycol bis-4-tert-butylcyclohexanecarboxylate. The ester had the following properties: Sp. g. 20/4 1.0122, $h$20/D 1.4279.

Esters having related properties are obtained by substituting the following alcohols for diethylene glycol in the above-described process: dipropylene glycol, 1,3-butylene glycol and tetra-ethylene glycol.

*Example II*

About 100 parts of 4-tert-butylcyclohexanecarboxylic acid, 48 parts of 3,3'-thiodipropanol and 100 parts of toluene are placed in a kettle described in Example I. The apparatus is swept out with carbon dioxide and 0.2 part of sulfuric acid added. The mixture is then heated to reflux with a slow stream of carbon dioxide being passed through the reaction chamber. When no further water separates the reaction mixture is diluted with 200 parts of benzene, and the resulting mixture treated as in Example I. After flashing off the benzene and stabilizing at 2–3 mm. a viscous oil is recovered which is identified as 3,3'-thiodipropanol bis-4-tert-butylcyclohexanecarboxylate.

Esters having related properties are obtained by substituting equivalent amounts of each of the following alcohols for the 3,3'-thiodipropanol; 4,4'-thiodibutanol; 3,5-dithiahexanediol-1,6; 4,4'-thiodihexanol; and 4,7-dithiadodecanediol-1,10.

*Example III*

About 150 parts of 4-tert-hexylcyclohexanecarboxylic acid produced from p-tert-hexylbenzoic acid by the method shown in Example I, 38 parts of 1,5-pentanediol and 105 parts of toluene are placed in the above-described kettle. The apparatus is swept out with carbon dioxide and 0.2 part of sulfuric acid added. The mixture is heated to reflux with a slow stream of carbon dioxide being passed through the reaction chamber. When no further water separated, the reaction mixture is diluted with benzene as described above. After flashing off the benzene a viscous liquid is recovered which was identified as 1,5-pentanediol bis-4-tert-hexylcyclohexanecarboxylate.

Esters having related properties are obtained by substituting equivalent amounts of each of the following alcohols for the 1,5-pentanediol; 1,6-hexanediol; 1,4-butanediol; and 1,7-hexanediol.

*Example IV*

About 150 parts of 4-tert-butylcyclohexanecarboxylic acid are mixed with 35 parts of glycerol, 125 parts of toluene and 0.2 part of sulfuric acid and the resulting mixture heated under reflux during which time the theoretical amount of water is collected as an azeotrope. The mixture is then diluted with benzene and treated as shown in Example I. After flashing off the benzene a liquid ester is recovered which is identified as glycerol tri-4-tert-butylcyclohexanecarboxylate.

Esters having related properties are obtained by substituting equivalent amounts of each of the following alcohols for glycerol; 1,3,5-hexanetriol, trimethylolpropane, and pentaerythritol.

*Example V*

An aqueous solution of sodium 3,5-di(tert-butyl)benzoate is prepared by dissolving 350 parts of 3,5-di(tert-butyl)benzoic acid in 1000 parts of a sodium hydroxide solution. About 10 parts of Raney nickel is then added to 200 parts of the above-described solution which is slightly alkaline and the resulting mixture exposed to 1000 pounds hydrogen pressure at a temptrature of about 175° C. When no further reduction in pressure took place the product was recovered by filtration and subsequently acidified with hydrochloric acid. The solid that separates is filtered and dried. The material that is recovered after recrystallization from dilute alcohol is identified as 3,5-di(tert-butyl)cyclohexanecarboxylic acid.

About 160 parts of 3,5-di(tert-butyl)cyclohexanecarboxylic acid produced above are mixed with 30 parts of 1,5-pentanediol, 150 parts of toluene and 0.2 part of sulfuric acid and the resulting mixture heated under reflux during which time the theoretical amount of water is collected as an azeotrope. The mixture is then diluted with benzene as shown in Example I. After flashing off the benzene, 1,5-pentanediol 3,5-di(tert-butyl)cyclohexanecarboxylate is recovered as the desired product.

*Example VI*

About 160 parts of 4-tert-octylcyclohexanecarboxylic acid obtained by hydrogenating p-tert-octylbenzoic acid by the method shown in Example I, are mixed with 30 parts of 1,5-pentanediol, 150 parts of toluene and 0.2 part of sulfuric acid and the resulting mixture heated under reflux during which time the theoretical amount of water is collected. When no further water separates, the reaction mixture is diluted with benzene. After flashing off the benzene, 1,5-pentanediol bis-4-tert-octyl cyclohexanecarboxylate is recovered as the desired product.

*Example VII*

About 100 parts of poly(vinyl chloride) was compounded with 60 parts of diethylene glycol bis-4-tert-butylcyclohexanecarboxylate by mixing the two ingredients together with two parts per 100 parts of polymer of a trade stabilizer, milling the mixture together on a roll mill at a temperature between 130° C. and 150° C., and then molding the resulting sheet at 160° C. for two minutes. The resulting sheet possessed good tensile strength and improved low temperature flexibility.

Volatility was determined on compression molded discs two inches in diameter and 0.045 inch thick. These discs were conditioned for one hour at 100° C., weighed, placed back in the oven for 100 hours at 100° C. and reweighed. The difference in weight represents the amount of plasticizer lost. The loss of plasticizer was then compared with the loss of bis(2-ethylhexyl)phthalate from a similarly compounded resin, the latter being assigned a value of one. The above-described plasticized sheet containing the diethylene glycol bis-4-tert-butylcyclohexanecarboxylate showed a volatility of only 0.1 that of a similar composition plasticized with bis(2-ethylhexyl)phthalate.

*Example VIII*

About 100 parts of poly(vinyl chloride) is compounded with 60 parts of 3,3'-thiodipropanol bis-4-tert-butylcyclohexanecarboxylate according to the procedure shown in the preceding example. The resulting sheet possesses good tensile strength, excellent flexibility over a wide range of conditions and good resistance to water. The plasticized composition shows a much lower loss of plasticizer than a similar sheet plasticized with bis(2-ethylhexyl)phthalate.

*Example IX*

About 100 parts of poly(vinyl chloride) is compounded with 60 parts of 1,5-pentanediol bis-4-tert-hexylcyclohexanecarboxylate according to the above-described process. The resulting sheet possesses good strength and flexibility over a wide range of conditions and shows a much lower loss of plasticizer than a similar sheet plasticized with bis(2-ethylhexyl)phthalate.

*Example X*

About 100 parts of a copolymer of 95% vinyl chloride and 5% vinyl acetate is compounded with 50 parts of glycerol tri-2-chloro-4-tert-octylcyclohexanecarboxylate. The resulting sheet possesses good strength, improved flexibility over a wide range of temperatures and low volatility.

*Example XI*

About 100 parts of a copolymer of vinyl chloride and vinylidene chloride is compounded with 50 parts of 3,3'-thiodibutanol bis-4-tert-decylcyclohexanecarboxylate. The resulting sheet possesses good tensile strength, improved low temperature flexibility and excellent heat stability and water resistance.

We claim as our invention:

1. An ester of a tertiary alkyl-substituted cyclohexanecarboxylic acid wherein the tertiary alkyl group contains no more than 9 carbon atoms and a polyhydric alcohol of the group consisting of open-chain aliphatic hydrocarbon polyhydric alcohols, open-chain aliphatic oxahydrocarbon polyhydric alcohols and open-chain aliphatic thiahydrocarbon polyhydric alcohols, all of the hydroxyl groups of the polyhydric alcohol being esterified with the said substituted cyclohexanecarboxylic acid.

2. An ester of 4-tert-alkylcyclohexanecarboxylic acid wherein the tertiary alkyl group contains no more than 9 carbon atoms and a polyhydric alcohol of the group consisting of open-chain aliphatic hydrocarbon polyhydric alcohols, open-chain aliphatic oxahydrocarbon polyhydric alcohols and open-chain aliphatic thiahydrocarbon polyhydric alcohols, all of the hydroxyl groups of the polyhydric alcohol being esterified with the said cyclohexanecarboxylic acid.

3. An ester of 4-tert-alkylcyclohexanecarboxylic acid wherein the tertiary alkyl group contains no more than 9 carbon atoms and an open-chain aliphatic thiahydrocarbon polyhydric alcohol, all of the hydroxyl groups on the said polyhydric alcohol being esterified with the tert-alkyl cyclohexanecarboxylic acid.

4. An ester of an alkanediol and a 4-tert-alkylcyclohexanecarboxylic acid wherein the tertiary alkyl group contains no more than 9 carbon atoms, all of the hydroxyl groups on the said alkanediol being esterified with the said cyclohexanecarboxylic acid.

5. 1,5 - pentanediol bis - 4 - tert - hexycyclohexanecarboxylate.

6. Glycerol tri - 4 - tert - butylcyclohexanecarboxylate.

7. 3,3' - thiodipropanol bis - 4 - tert - butylcyclohexanecarboxylate.

8. Diethylene glycol bis - 4 - tert - butylcyclohexanecarboxylate.

9. 1,5 - pentanediol bis - 3,5 - ditert - butylcyclohexanecarboxylate.

References Cited in the file of this patent

UNITED STATES PATENTS

| | | |
|---|---|---|
| 2,451,895 | White | Oct. 19, 1948 |
| 2,504,929 | Hetzel | Apr. 18, 1950 |
| 2,600,275 | Smith | June 10, 1952 |
| 2,671,060 | Morris et al. | Mar. 2, 1954 |